Oct. 31, 1961  R. H. GEORGE  3,006,368
TRACTOR BRAKE SYSTEM PROTECTIVE VALVES
Filed Nov. 13, 1958  2 Sheets-Sheet 2
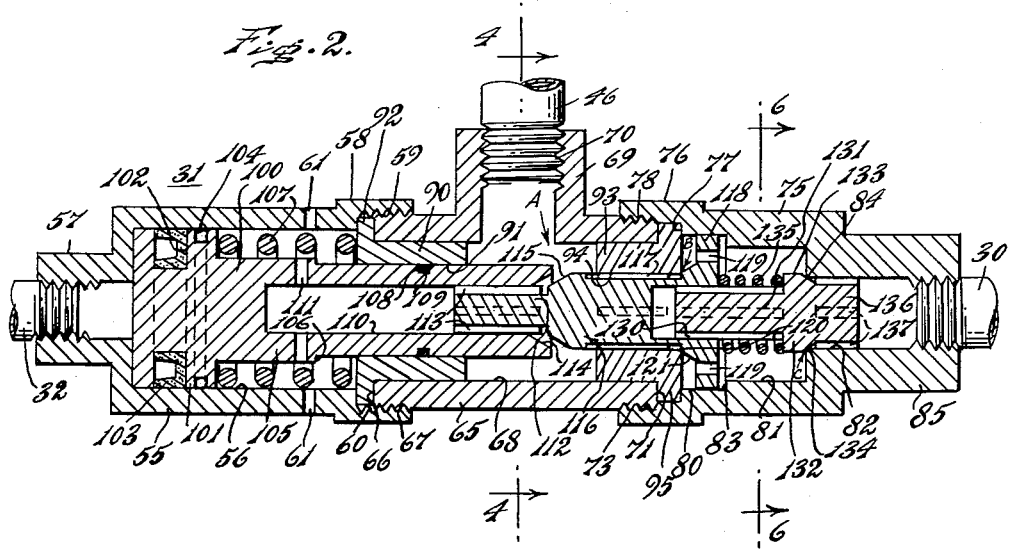
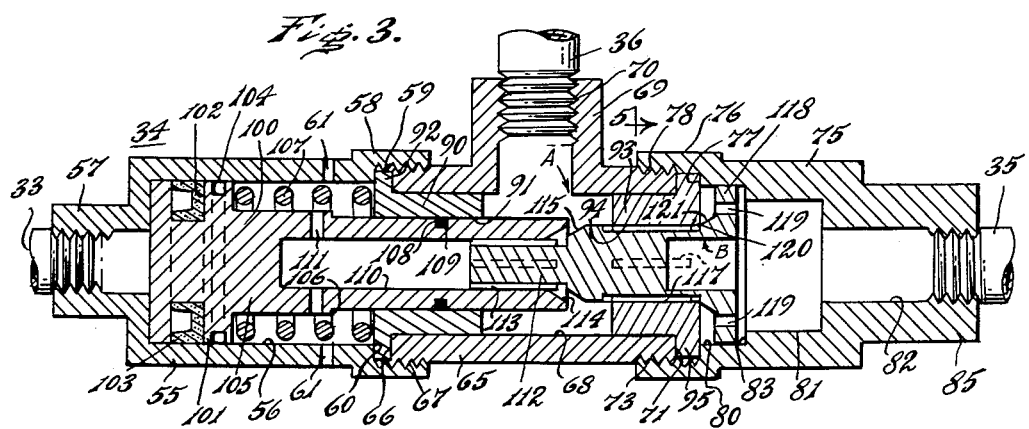
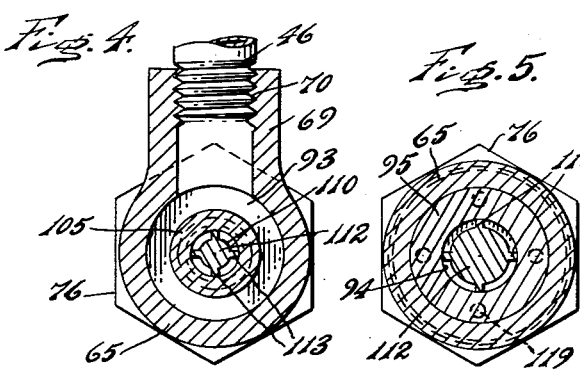
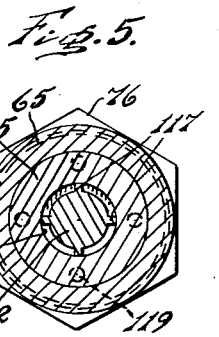
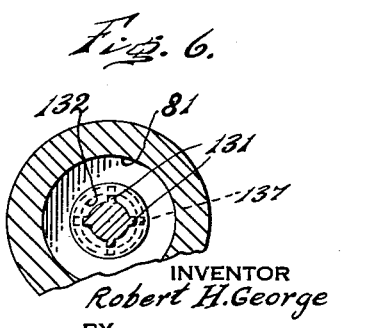
INVENTOR
Robert H. George
BY
B. T. Wobensmith
ATTORNEY

United States Patent Office 3,006,368
Patented Oct. 31, 1961

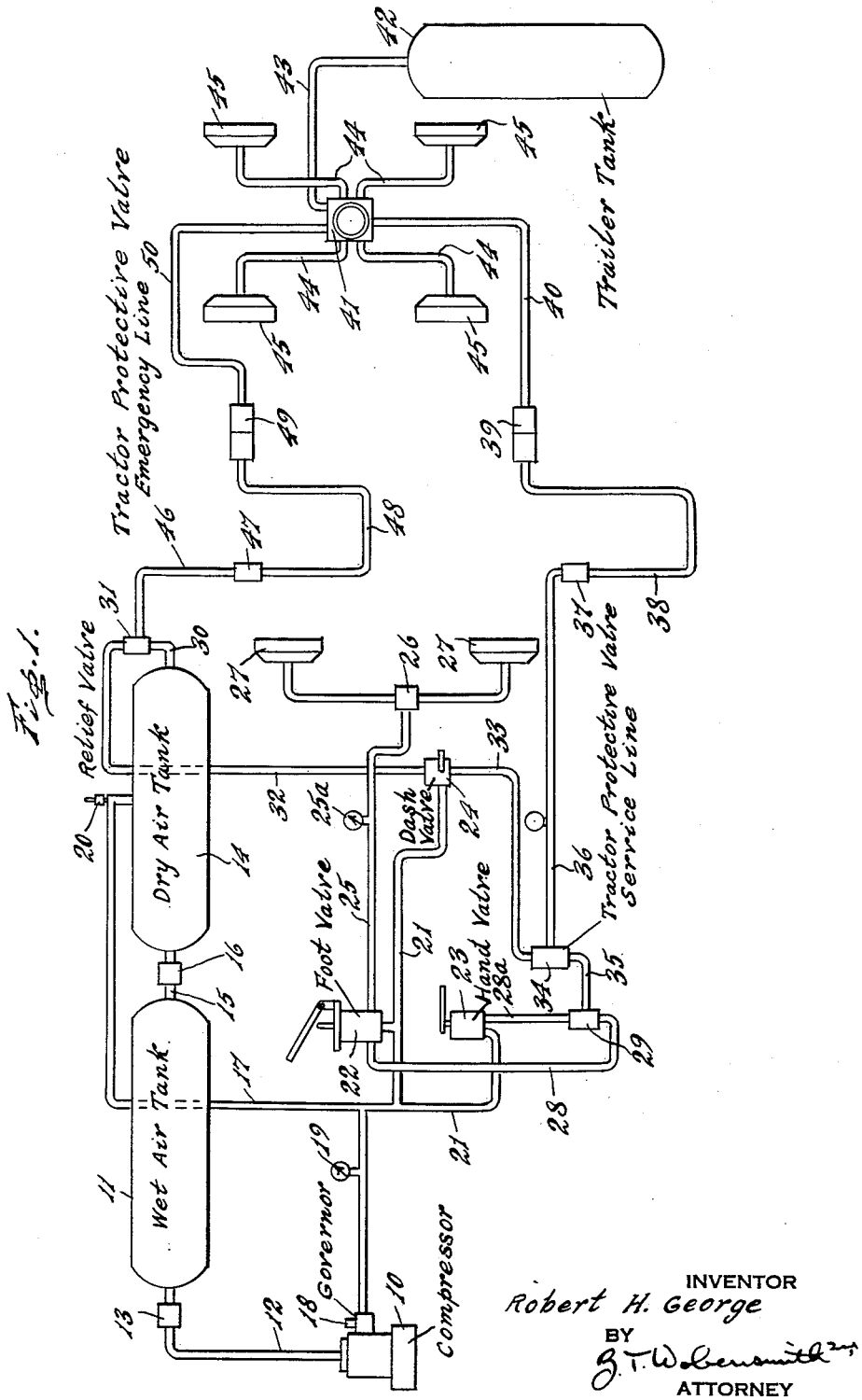

3,006,368
TRACTOR BRAKE SYSTEM
PROTECTIVE VALVES
Robert H. George, Melrose Park, Pa., assignor to Brakemaster Corporation, Philadelphia, Pa., a corporation of Pennsylvania
Filed Nov. 13, 1958, Ser. No. 773,645
4 Claims. (Cl. 137—614.2)

This invention relates to tractor brake system protective valves, and more particularly to valves suitable for use with the automotive air brake systems of tractor-trailers.

It is the principal object of the present invention to provide valves for use with automotive air brake systems of tractor-trailers which will function to protect the brake system of the tractor so that the brakes of the tractor can be applied in the case of breakaway of the trailer from the tractor.

It is a further object of the present invention to provide valves for use with automotive air brake systems of tractor-trailers so that the air for the air brakes is safeguarded against backflow through the supply line to the trailer brake system in the event of a breakaway of the trailer from the tractor.

It is a further object of the present invention to provide valves for use with automotive air brake systems of tractor-trailers by which an automatic and prompt operation of the brakes of the trailer will be effective upon breakaway of the trailer from the towing vehicle.

It is a further object of the present invention to provide tractor brake system protective valves for use in air brake systems of automotive vehicles in which a two position dashboard emergency valve is employed for emergency application of the trailer brakes and which, upon either automatic or manual operation of the dashboard valve, will be available for exercising its protective functions.

It is a further object of the present invention to provide tractor brake system protective valves which will prevent back flow of air from the trailer brake system to the tractor brake system in the event of leakage of the no-bleed-back emergency relay and which will operate satisfactorily with either the bleed back or the no bleed back type of emergency relay now considered necessary to meet safety requirements.

It is a further object of the present invention to provide valves for use in automotive air brake systems which will not be adversely affected by water, oil, carbon and sludge introduced by the compressor and distributed during operation throughout the air brake system.

It is a further object of the present invention to provide tractor brake system protective valves for use with automotive air brake systems which will not be rendered inoperative or caused to leak by reason of the presence of water, oil, carbon and sludge found in such systems.

It is a further object of the present invention to provide tractor brake system protective valves for use with automotive air brake systems which will function continuously for long periods of time under the difficult conditions encountered in tractor-trailer operation.

Other objects and advantageous features of the invention will be apparent from the description and claims.

The nature and characteristic features of the invention will be more fully understood from the following description, taken in connection with the accompanying drawings forming part thereof, in which:

FIGURE 1 is a diagrammatic view of an air brake system for automotive vehicles with protective valves in accordance with the present invention employed therewith;

FIG. 2 is a vertical longitudinal central sectional view of a tractor brake system protective valve in accordance with the present invention for use in the emergency pressure line to the trailer;

FIG. 3 is a vertical longitudinal central sectional view of a tractor brake system protective valve in accordance with the invention for use in the service line to the trailer;

FIG. 4 is a transverse vertical sectional view taken approximately on the line 4—4 of FIG. 2;

FIG. 5 is a transverse vertical sectional view taken approximately on the line 5—5 of FIG. 3; and FIG. 6 is a transverse vertical sectional view taken approximately on the line 6—6 of FIG. 2.

It should of course be understood that the description and drawings herein are illustrative merely, and that various modifications and changes can be made in the structure disclosed without departing from the spirit of the invention.

Like numerals refer to like parts throughout the several views.

Referring now more particularly to FIG. 1 of the drawings, an automotive air brake system of known type for tractor-trailers is diagrammatically shown having the protective valves in accordance with the invention included therein.

In the system illustrated in FIG. 1, an air compressor 10 is employed which serves as a primary source of braking air under pressure and which has its delivery side in communication with a wet air tank 11 by means of a fluid connection 12 with a non-return or check valve 13 interposed therein.

The wet air tank 11 is in communication with a dry air tank 14 through a fluid connection 15 having a non-return or check valve 16 interposed therein.

The dry air tank 14 has a fluid connection 17 which extends to a governor 18 for the compressor 10 for regulating the compressor operation and the fluid connection 17 can be provided with an indicating fluid pressure gage 19 for indicating the pressure in the fluid connection 17. The fluid connection 17 has a pressure responsive overload relief valve 20 connected thereto.

A branch fluid connection 21 extends from the fluid connection 17 to a foot valve 22 in the cab of the tractor for pedal control of the application and release of the brakes of both the tractor and the trailer. The foot valve 22 effects a controlled delivery of pressure fluid, dependent upon the extent to which it is depressed, and has a controlled bleed or exhaust to atmosphere effective for brake release.

The branch fluid connection 21 also extends to a hand operated valve 23 in the cab of the tractor for variable manual control of the application and release of the trailer brakes. The valve 23 is similar in its action to the foot valve 22 in effecting a controlled delivery of pressure fluid, dependent upon the extent to which it is turned, and has a controlled bleed or exhaust to atmosphere effective for brake release.

The branch fluid connection 21 also extends to a two position hand operated emergency valve 24 located on the dashboard for the emergency application of the trailer brakes. The valve 24 in its normal and nonemergency position permits of the delivery of pressure fluid from a pressure fluid source therethrough and to its delivery connections, and in its emergency position shuts off the source and vents its delivery connections to the atmosphere.

From the foot valve 22 a fluid connection 25 extends through a quick release valve 26 to the brake operating diaphragms 27 of the rear tractor brakes. The fluid connection 25 can have an indicating fluid pressure gage 25a interposed therein for indicating the fluid pressure in the fluid connection 25.

Fluid connections 28 and 28a are also provided from the foot valve 22 and the hand valve 23 to a double acting check valve 29.

The dry tank 14 also has a fluid connection 30 in communication therewith and with a tractor brake system protective valve 31, as illustrated in more detail in FIG. 2. The valve 31 also has a fluid connection 32 thereto from the dash valve 24.

The dash valve 24 has a fluid connection 33 extending therefrom to a tractor brake system protective valve 34, which is illustrated in more detail in FIG. 3, a fluid connection 35 being provided between the check valve 29 and the valve 34.

The valve 34 has a normal service line connected thereto for supplying and returning air, in the normal service operation of the trailer brakes, and this service line includes in series relation a fluid connection 36, a connecting nipple 37, a flexible fluid connection or hose 38, a detachable trailer coupling 39 and a fluid connection 40. The fluid connection 40 is connected to an emergency relay valve 41 of known type, and which may be of the type known as a no bleed-back emergency relay valve, or of the type known as a bleed-back emergency relay valve.

The emergency relay valve 41 has the main trailer air supply tank 42 connected thereto by a fluid connection 43 and has connections 44 extending to the diaphragms 45 of brake operating motors for brake applying operations on the trailer.

The emergency relay valve 41 includes valve mechanism of known type with various operating positions including trailer air supply tank charging positions with the air pressure below or above a predetermined level, commonly taken as 70 p.s.i. The relay valve 41 also has normal operating positions which include a release position when there is no air pressure in the brake diaphragm chambers 45, an applying position when the air pressure is delivered to or increased in the brake diaphragm chambers 45, a balanced position when the mechanism is balanced for maintaining a constant pressure in the brake diaphragm chambers 45, and a releasing position in which the mechanism is releasing or reducing the air pressure in the brake diaphragm chambers 45.

The emergency relay valve 41 also has an emergency position in which the mechanism automatically delivers the full pressure available in the trailer tank 42 to the brake diaphragm chambers 45. This emergency brake application is effected when the pressure in the emergency line drops suddenly due to uncoupling of the coupling 49 or to trailer breakaway, or by actuation of the dash valve 24 to its emergency position.

The valve 31 has an emergency service line connected thereto for supplying air for charging the tank 42 and for controlling the emergency relay valve 41, and includes in series relation a fluid connection 46, a connecting nipple 47, a flexible fluid connection or hose 48, a detachable trailer coupling 49 and a fluid connection 50 to the emergency relay valve 41.

The couplings 39 and 49 are the customary couplings employed for connecting the brake system of the trailer to the brake system of the tractor.

Referring now more particularly to FIG. 2 of the drawings, the tractor brake system protective valve 31 there shown preferably includes a main hollow cylindrical housing section 55 having an internal cylindrical bore 56, a longitudinally axially disposed internally threaded boss 57 for the connection of the fluid connection 32, with an enlargement 58 at the other end which is internally threaded at 59.

The housing section 55 has an internal shoulder 60 at the inner end of the internaly threaded portion 59. The housing section 55 has a plurality of discharge ports 61 connecting the interior of the bore 56 to the atmosphere.

A second housing section 65 is provided having an end shoulder 66 and an externally threaded end 67 for engagement in the threaded portion 59 of the housing section 55.

The second housing section 65 has an internal cylindrical bore 68 longitudinally axially aligned with the bore 56, and has an outwardly extending boss 69 connected thereto and communicating with the bore 68. The boss 69 is internally threaded as at 70 for the connection of the fluid connection 46 thereto.

The second housing section 65 also has an opposite end shoulder 71 and an externally threaded end 73.

A third housing section 75 is provided having an enlargement 76 with an inner end shoulder 77 and with an internally threaded portion 78 for engagement of the threaded portion 73 of the second housing section 65.

The third housing section 75 is provided with an internal longitudinally axially disposed cylindrical bore 80, a longitudinally axially disposed intermediate cylindrical bore 81 and a longitudinally axially disposed end bore 82, the bores 80, 81 and 82 being longitudinally axially aligned with the bores 56 and 68.

The inner terminus of the bore 80 provides a limit shoulder 83 for purposes to be explained, and the end of the bore 81 at its intersection with the bore 82 provides a valve seat 84.

The third housing section 75 also has a longitudinally axially disposed internally threaded boss 85 for the connection of the fluid connection 30.

Within the interior of the second housing section 65, a hollow sleeve 90 is provided, which has an internal bore 91 longitudinally coaxially disposed with respect to the bore 68 to serve as a guide and has a radially outwardly extending positioning flange 92 which is engaged by the shoulder 60 at the end of the housing section 55 and the shoulder 66 at the end of the housing 65 for retaining the same in position when the housing sections 55 and 65 are assembled.

Within the interior of the second housing section 65 also, a hollow sleeve 93 is provided having an internal bore 94 longitudinally coaxially disposed with respect to the bore 91. The sleeve 93 has a radially outwardly extending positioning flange 95 which is engaged by the end shoulder 71 of the housing section 65 and by the shoulder 77 of the housing section 75 for retaining the sleeve 93 in position when the housing sections 65 and 75 are assembled.

A piston 100 is provided having a head 101 slidably mounted within the bore 56, the head 101 being provided with an end groove 102 for the reception of a packing 103, such as a U-cup of rubber or the like for preventing fluid leakage along the bore 56 and with a collecting groove 104 for the reception of dirt tending to find its way thereinto during the movement of the piston 100.

The piston 100 also includes, integrally connected with the head 101, a hollow stem portion 105 having a shoulder 106 formed thereon for engagement with the end of the sleeve 90 and limiting the movement thereof in one direction. A helical compression spring 107 of predetermined spring rate is provided surrounding the stem portion 105 and by its engagement with the sleeve 90 and the inner end of the head 101 normally urges the piston 100 towards the left, as seen in FIG. 2, dependent upon the pressure applied on the outer end thereof through the fluid connection 32.

For one particular set of operating conditions, the spring 107 requires a force in opposition thereto of the order of 50 p.s.i. before any movement of the piston 100 occurs.

The stem portion 105 of the piston 100 is provided on the exterior thereof with a groove 108 for the reception of a packing ring 109, such as an O-ring, for preventing fluid leakage along the bore 91, the groove 108 being longitudinally positioned on the stem portion 105 so as to always be in engagement with the bore 91 in the sleeve 90 upon movement of the piston 100.

The valve stem portion 105 has an interior longitudinal axial bore 110 which is provided with vent openings 111 in continuous communication therewith and with the vent openings 61 in the housing section 65.

The bore 110 within the interior of the stem portion 105 also serves as a guide for a valve plug 112 which has a plurality of spaced ribs 113 thereon for permitting the flow of fluid therealong while guiding the valve plug 112. The end of the valve stem portion 105 opposite the piston head 101 is preferably provided with a frusto-conical or tapered portion 114 at the end thereof to serve as a valve seat and the valve plug 112 has a portion 115 for engagement therewith in seating relation. For purposes of explanation the separable and interengaging valve plug portion 115 and seat portion 114 will be referred to as valve part A.

The valve plug 112 also has a cylindrical portion 116 provided with a plurality of ribs 117, guided within the interior of the bore 94 for permitting the flow of fluid therealong.

The valve plug 112 has an outwardly extending flange 118 provided with a plurality of opening 119 therethrough for fluid flow, the flange 118 being adapted to engage the shoulder 83 for limiting the movement of the valve plug 112 towards the right, as seen in FIG. 2.

The valve plug 112 is provided with a valve seating portion 120 for engagement with a valve seat 121 at the outer end of the sleeve 93. For purposes of explanation the separable and interengaging valve seating portion 120 and valve seat 121 will be referred to as valve part B.

The valve plug 112 is further provided with a bore 130 for the reception of a cylindrical stem 131 of a check valve plug 132 which has a valve head 133 of greater diameter for engagement with the valve seat 134 formed at the end of the bore 130. For purposes of explanation the separable and interengaging valve head 133 and valve seat 134 will be referred to as valve part C.

A compression spring 135 of predetermined spring rate and of a spring rate less than that of the spring 107 is provided surrounding the intermediate portion of the check valve plug 132, and by its engagement with the valve head 133 and the flange 118 tends to urge the check valve plug 132 to a position to close the valve part C, while also urging the head 118 to a position to close the valve part B.

The check valve plug 132 also has a guide extending therefrom which includes a cylindrical portion 136 with a plurality of spaced ribs 137 therealong for engagement with the bore 82 to guide the check valve plug 132 but to permit fluid flow in open position of the valve part C.

The valve 34, shown in FIG. 3, is substantially the same as that illustrated and previously described with respect to the valve 31 except that the boss 57 has the fluid connection 33 connected thereto, the boss 69 has the fluid connection 36 connected thereto, and the boss 85 has the fluid connection 35 connected thereto, and the check valve plug 122 and its associated structure are omitted so that the trailer brakes can be released, as hereinafter explained.

Before taking up the mode of operation of the system illustrated in FIG. 1, a brief reference will be made to the operation of the valves 31 and 34.

The valve 31, as illustrated in FIG. 2 is capable of providing a number of operating positions. When no pressure is effective through the fluid connection 32 and against the head 101 of the piston 100, the piston head 101 is urged by the spring 107 to a position to open the valve part A so that the fluid connection 46 is vented to the atmosphere through the interior of the bore 110, the vent ports 111 and the vent openings 61. The valve part B will be closed and the valve part C will be closed.

As previously indicated, for one particular and preferred character of operation, the spring 107 exerts a force in opposition to the fluid pressure applied through the fluid connection 32 of the order of 50 p.s.i. before any movement of the piston 100 occurs.

When the pressure rises above the predetermined set level, the piston head 101 moves against the force of the spring 107 to close the valve part A, thus discontinuing any venting. As the pressure effective through the fluid connection 32 continues to rise and when it attains a value of the order of 65 p.s.i., the further movement of the piston head 101 and the stem portion 105 is effective for moving the valve plug 112 to a position to open the valve part B so that communication is established between the fluid connections 30 and 46 subject to the control of the check valve plug 132. The valve part B is normally closed by the action of the spring 135 and will remain in closed position until moved therefrom by movement of the piston 100 after the valve part A has been closed. So long as there is no pressure in the fluid connection 30 the valve part C will also be closed.

The valve part C is effective at all times to prevent any flow from the fluid connection 46 to the fluid connection 30.

The valve 34 is utilized, as hereinafter explained, for causing a building up of effective brake pressure for tractor brake operation of the order of 65 p.s.i. before any charging of the trailer brake system can occur.

It will be noted that with the valve part B of the valve 34 open the fluid connection 46 and the bore 81 are connected, and upon a reduction of the pressure effective on the piston head 101 and permitting the piston 100 to retract, the valve part B will first be closed, and upon further retraction of the piston 100 the valve A will be opened for venting the portion of the bore 63 in communication with the fluid connection 46.

The friction attendant upon engagement of the packing 103 and the packing 109 will be such that the actual opening or venting through the vent ports 111 and the vent opening 61 will occur at about 45 p.s.i.

The operation of the valve 34 is substantially similar to that previously explained with respect to the valve 31.

The mode of operation will now be described.

Assuming first that there is no pressure in the system, that the compressor 10 is operated to supply the pressure fluid to the wet air tank 11 and therefrom to the dry air tank 14, then air under pressure is delivered through the fluid connection 17 and the branch connection 21 and through the dash valve 24 to the fluid connection 32 where it is applied at the valve 31 and to the fluid connection 33 where it is applied at the valve 34 to position the pistons 100 of the valves 31 and 34 as previously explained.

As the pressure in the tank 14 reaches a predetermined value, of the order of 50 p.s.i., this pressure is effective against the piston 100 of the valve 31 to initiate movement of the piston 100 against the force of the spring 107 to close the valve part A and cut off venting of the fluid connection 46. Futher increase in pressure to a level of the order of 65 p.s.i. and further movement of the piston 100 is effective for opening the valve part B. Fluid under pressure is thus permitted to flow from the tank 14 through the fluid connection 30, past the valve part C which opens to permit the delivery and past the valve part B to the fluid connection 46. The fluid under pressure delivered to and through the fluid connection 46 is delivered through the emergency relay valve 41 for charging the tank 42.

At the same time that the pressure is effective on the valve 31 it is also effective at the valve 34 and by movement of its piston 100 also first cuts off communication of the fluid connection 36 with the atmosphere and then establishes communication between the fluid connection 35 and the fluid connection 36.

With the tanks 11, 14 and 42 charged with fluid under pressure, as previously explained, the system is in condition for normal brake applying and releasing operation.

If it is desired to partially or wholly apply both the tractor and trailer brakes, upon operation of the foot valve 22, air under pressure, determined by the movement of the foot valve 22, will be supplied through the fluid connection 21 through the fluid connection 25 and quick release valve 26 to the brake operating diaphragms 27 of the tractor brakes. Air will also be supplied through the fluid connection 28, the double acting check valve 29 and the fluid connection 35, to and through the open valve part B of the tractor protective valve 34 to the service line, including the fluid connection 36, the connecting nipple 37, the flexible fluid connection 38, the trailer coupling 39, and to the emergency relay valve 41 for applying pressure at the diaphragms 45 of the trailer brake operating mechanism. The release of the brakes is controlled by the foot valve 22.

If it is desired to partially or wholly apply the trailer brakes, upon operation of the hand valve 23, air under pressure determined by the movement of the hand valve 23 will be supplied through the fluid connection 28a, the double acting check valve 29, the fluid connection 35, the tractor protective valve 34 and the service line including the fluid connection 36, the connecting nipple 37, the flexible fluid connection 38 and the trailer coupling 39 to the emergency relay valve 41 for applying pressure at the diaphragms 45 of the trailer brake operating mechanism. The trailer brakes can be released by venting the fluid connection 36 by the hand valve 23.

If it is desired to employ the dash valve 24 for emergency application of the trailer brakes, this valve 24 is moved to its emergency position to quickly vent the fluid connection 32. When the fluid connection 32 is vented the valve 31, by the relief of the pressure on its piston 100 is actuated to open the valve part A thereof to vent the fluid connection 46 through vent ports 111 and the venting openings 61. The removal of the pressure theretofore available at the emergency relay 41 through the fluid connection 46 causes immediate application of the trailer brakes by the pressure available in the tank 42.

The trailer brakes will be released upon reestablishment of the pressure in the fluid connection 32.

It will thus be seen that the system is available for conventional operation of both the tractor and trailer brakes, or the trailer brakes alone, or for emergency application of the trailer brakes.

The present invention is particularly suited for conditions over and beyond those encountered in normal operation. In the event of a breakaway of the trailer from the tractor, it will be noted that this involves a break in the emergency line of the relay valve 41 and in the main service line to the relay valve 41, which for purposes of explanation can be considered as a separation of each of the couplings 39 and 49.

It is essential, upon breakaway of the trailer, that tractor braking be available and therefore waste of the tractor air must be avoided.

When the pressure in the tanks 11 and 14 falls to a predetermined pressure level, of the order of about 45 p.s.i., the reduction of the pressure on the piston 100 within the valve 31 is effective for closing the valve part B and thus closing off communication between the fluid connection 30 and the fluid connection 46, and connecting the fluid connection 46 through the open valve part A to the vent ports 111 and venting openings 61. No air will be permitted to escape from the tanks 11 and 14 at the valve 31 since the fluid connection 46 is sealed off by closing of the valve part B.

In a similar fashion, the piston 100 of the valve 34 is also retracted by its spring 107 to close off communication between the fluid connections 36 and 35 by closing of valve part B of the valve 34, so that no waste of air can occur at this location.

The tractor brakes can then be controlled by the foot valve 22 in the manner previously explained, and with the lowered air pressure.

It should be noted that if the emergency line breaks, such as by separation of the coupling 49, the trailer brakes will be set in the manner previously explained in connection with the operation of the dash valve 24, and will remain in set condition utilizing the air in the tractor tank 42 until this is lost by leakage.

The protective valves 31 and 34 are useful either with the older type of leakback valve employed for the emergency relay valve 41 or with the no bleed back type valve employed as valve 41. On the no-bleed back type relay valves now available on the market dirt in the system frequently finds its way onto a valve seat so that the no-bleed feature is rendered ineffective. The effect of the undesired leakage is obviated with the protective valves of the present invention.

If a leak should occur in the tractor system so that the pressure in the tanks 11 and 14 drops, the valve 31 with only the reduced pressure effective thereagainst would cause venting of the fluid connection 46. When the pressure was reduced to a level of the order of 40 p.s.i the trailer brakes would be set by the action of the emergency relay 41 in the manner previously explained.

Under these conditions the only manner in which the trailer brakes could be released would be to bleed the trailer tank 42, or upon repair of the tractor leak upon recharging to pressure levels of the order of 65 p.s.i. and above, the tank 42 would be recharged and permit the trailer brake release.

I claim:

1. A protective valve for interposition in the fluid lines between the tractor and trailer brake components of tractor trailer type automotive brake systems and for isolating the tractor brake system upon rupture of the fluid lines comprising a housing having a plurality of longitudinally axially aligned housing sections with separable threaded connections therebetween, a first of said housing sections having a fluid connection for the delivery of a controlling pressure fluid thereinto, a second of said housing sections having a fluid delivery connection communicating with the interior thereof, a third of said housing sections having a supply fluid connection in communication with the interior thereof for pressure fluid supply thereto, a piston in said first housing section against which said controlling pressure fluid is applied, a resilient member urging said piston in opposition to the force of said controlling pressure fluid, said piston having a valve stem extending longitudinally axially therefrom in said housing and from said first housing section into said second housing section, said valve stem having a passageway therein, said passageway having venting openings and said first housing section having vent ports in communication with the atmosphere and with which said venting openings are in communication, a valve member disposed in said second and third housing sections longitudinally axially movable with respect to said stem, said valve member and said stem having interengaging portions for cutting off communication between the interior of said second housing section and said passageway, said valve member having a portion engageable with an interior part of said housing for cutting off communication between the interior of said third housing section and the interior of said second housing section, the interengaging portions of said stem and said valve member in engaged position impelling said valve member to open position upon predetermined movement of said piston, said piston being movable to a plurality of positions including a position in which said fluid delivery connection is in communication through said venting openings and said vent ports with the atmosphere, a position in which said stem and said valve member are engaged and said vent ports are cut off, and a position in which with said vent ports cut off communication is established between the interior of said third housing section and the interior of said second housing section for connecting said fluid supply connection and said fluid delivery connection.

2. A protective valve for automotive brake systems as defined in claim 1, in which a second resilient member is provided in said third housing section, and a check valve is provided in said third housing section with which said second resilient member is in engagement, said check valve being normally urged by said second resilient member to cut off fluid flow to said fluid supply connection.

3. A protective valve for interposition in the fluid lines between the tractor and trailer brake components of tractor trailer type automotive brake systems and for isolating the tractor brake system upon rupture of the fluid lines comprising a housing having a plurality of longitudinally axially aligned housing sections with separable threaded connections therebetween, a first of said housing sections having a fluid connection for the delivery of a controlling pressure fluid thereinto, a second of said housing sections having a fluid delivery connection communicating with the interior thereof, a third of said housing sections havng a supply fluid connection in communication with the interior thereof for pressure fluid supply thereto, a first hollow sleeve in said second housing section and held in position by the engagement therewith of said first and second housing sections, a second hollow sleeve in said second housing section and held in position by the engagement therewith of said second and third housing sections, a piston in said first housing section against which said controlling pressure fluid is applied. a resilient member urging said piston in opposition to the force of said controlling pressure fluid, said piston having a valve stem extending from said first housing section into said second housing section in slidable engagement in said first hollow sleeve, said valve stem having a bore therein, said bore having venting openings and said first housing section having vent ports in communication with the atmosphere with which said venting openings are in communication, a valve member disposed in said second and third housing sections longitudinally axially with respect to said stem, said valve member having a portion in slidable engagement in said second hollow sleeve, said valve member and said stem having interengaging portions for cutting off communication between the interior of said second housing section and said bore, said valve member having a portion engageable with said second sleeve for cutting off communication between the interior of the third housing section and the interior of the second housing section, the interengaging portions of said stem and said valve member in engaging position impelling said valve member to open position upon predetermined movement of said piston, said piston being movable to a plurality of positions including a position in which said fluid delivery connection is in communication through said venting openings and said vent ports with the atmosphere, a position in which said stem and said valve member are engaged and said bent ports are cut off, and a position in which with said vent ports cut off communication is established between the interior of said third housing section and the interior of said second housing section for connecting said fluid supply connection and said fluid delivery connection.

4. A protective valve for automotive brake systems as defined in claim 3, in which a second resilient member is provided in said third housing section and a check valve is provided in said third housing section with which said second resilient member is in engagement, said check valve being normally urged by said second resilient member to cut off fluid flow to said fluid supply connection.

References Cited in the file of this patent

UNITED STATES PATENTS

| | | |
|---|---|---|
| 1,302,538 | Gulick | May 6, 1919 |
| 1,954,662 | Bond | Apr. 10, 1934 |
| 2,331,800 | Rockwell | Oct. 12, 1943 |
| 2,361,419 | Schnell | Oct. 31, 1944 |
| 2,404,924 | Sacchini | July 30, 1946 |
| 2,470,746 | Schultz | May 17, 1949 |
| 2,579,616 | Sahlgaard | Dec. 25, 1951 |
| 2,718,897 | Andrews | Sept. 27, 1955 |
| 2,818,138 | Ostwald et al. | Dec. 31, 1957 |
| 2,841,178 | Schultz | July 1, 1958 |
| 2,859,763 | Fites | Nov. 11, 1958 |
| 2,883,997 | Schultz | Apr. 28, 1959 |